United States Patent [19]

Bardo et al.

[11] Patent Number: 5,236,625
[45] Date of Patent: Aug. 17, 1993

[54] STRUCTURAL ASSEMBLY

[75] Inventors: Charles J. Bardo; Toby L. Daley, both of Fort Worth, Tex.

[73] Assignee: BAC Pritchard, Inc., Jessup, Md.

[21] Appl. No.: 840,504

[22] Filed: Feb. 24, 1992

[51] Int. Cl.$^5$ .............................................. E04B 2/46
[52] U.S. Cl. .................... 261/24; 261/112.2; 261/DIG. 11; 52/780; 52/73; 52/595
[58] Field of Search ................ 261/111, DIG. 11, 24, 261/112.2; 52/780, 73, 456, 486, 595, 630

[56] References Cited

U.S. PATENT DOCUMENTS

| | | | |
|---|---|---|---|
| 467,141 | 1/1892 | Seely | 52/253 |
| 785,950 | 3/1905 | Hindes | 52/253 |
| 835,863 | 11/1906 | Otte | 52/456 |
| 1,057,674 | 4/1913 | Sauber et al. | 52/780 |
| 1,114,584 | 10/1914 | Conzelman | 52/780 |
| 1,678,504 | 7/1928 | Glover | 52/780 |
| 1,789,827 | 1/1931 | McKay | 52/764 |
| 2,000,638 | 5/1935 | Hollingsworth et al. | 52/780 |
| 2,161,185 | 6/1939 | Mills | 52/486 |
| 3,100,556 | 8/1963 | De Ridder | 52/630 |
| 3,256,030 | 6/1966 | Banse | 52/665 |
| 3,593,477 | 7/1971 | Briggs | 52/253 |
| 3,596,884 | 8/1971 | Murphy | 261/DIG. 11 |
| 3,801,076 | 4/1974 | Furlong et al. | 261/DIG. 11 |
| 3,921,354 | 11/1975 | Connelly et al. | 52/73 |
| 3,959,830 | 6/1976 | Broek | 52/595 |
| 4,126,977 | 11/1978 | Chisum | 52/595 |
| 4,342,177 | 8/1982 | Smith | 52/665 |
| 4,422,983 | 12/1983 | Bardo | 261/DIG. 11 |
| 4,543,218 | 9/1985 | Bardo | 261/DIG. 11 |
| 4,557,091 | 12/1985 | Auer | 52/595 |
| 4,637,903 | 1/1987 | Bardo et al. | 261/DIG. 11 |
| 4,788,013 | 11/1988 | Kinney, Jr. et al. | 261/DIG. 11 |
| 4,976,895 | 12/1990 | Bardo | 261/DIG. 11 |
| 5,028,357 | 7/1991 | Bardo | 261/DIG. 11 |

Primary Examiner—Tim Miles
Attorney, Agent, or Firm—Edward J. Brosius; F. S. Gregorczyk; Thomas J. Schab

[57] ABSTRACT

The present invention provides a structural assembly that includes at least four vertically extending columns which form corners of the structural assembly. Wall panels extend between adjacent columns, with at least two wall panels vertically stacked and connected to each other, to form a structural wall assembly between adjacent columns. The ends of each of the wall panels are attached to flanges that extend from each of the columns. A structural column is provided in the center of the structure and braces extend from each of the corner columns to the riser. Beams also extend from the central riser outwardly to certain of the wall panels, usually connecting to the wall panels at a location equidistant between the columns. A roof structure is provided, the edges of which are received in spaces in certain of the top wall panels. In a cooling tower application of the present invention, a fan assembly is supported on the top of the central column water inlet riser and includes a fan shroud supported by the roof.

74 Claims, 10 Drawing Sheets

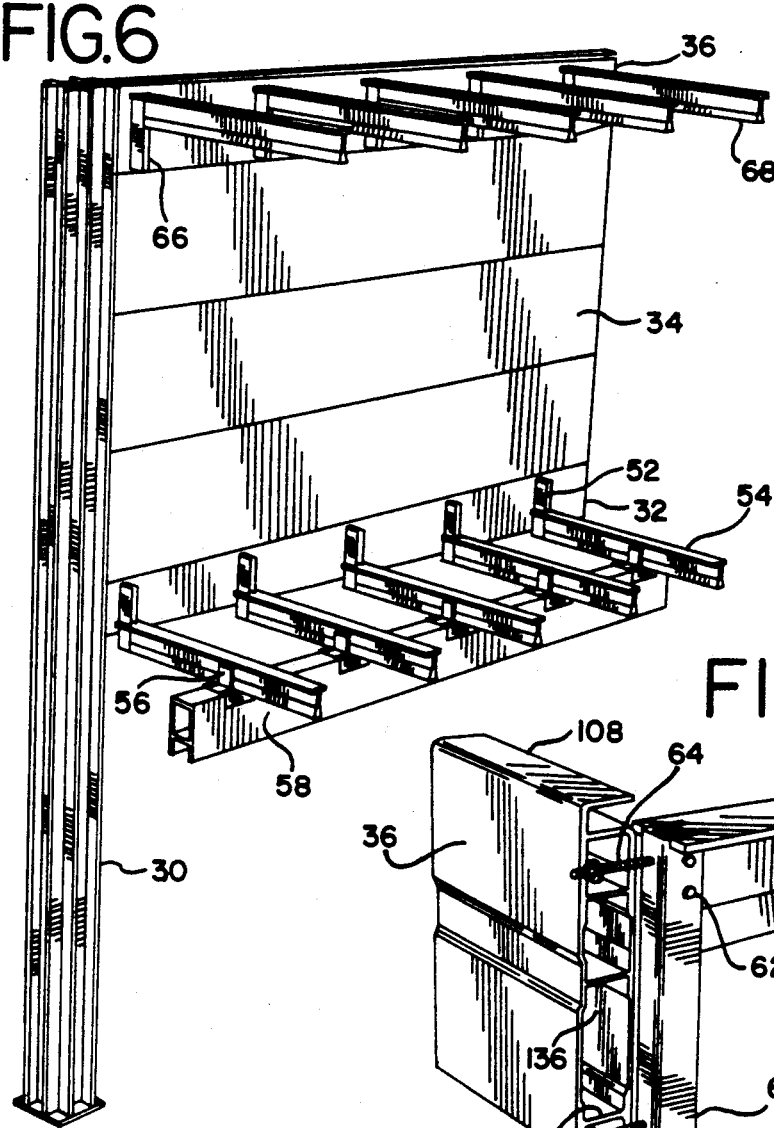
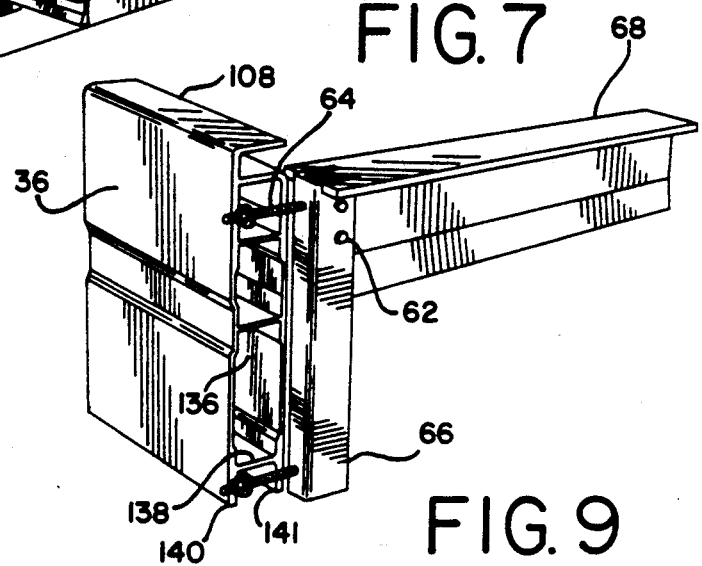
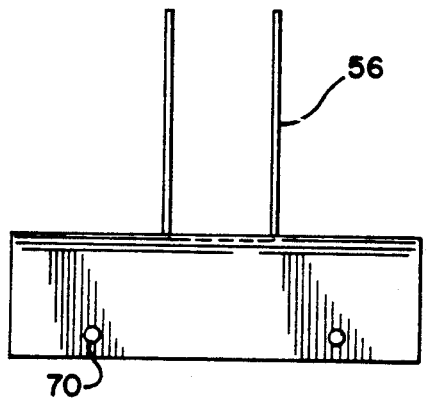
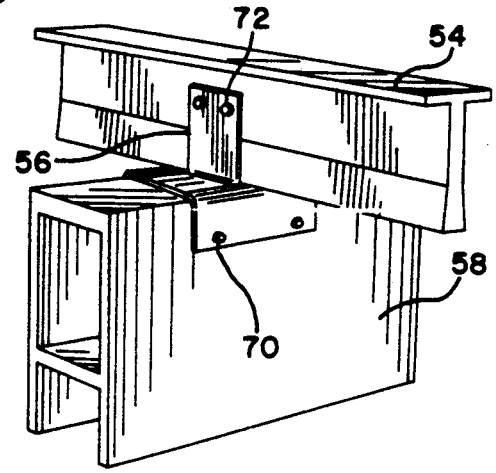

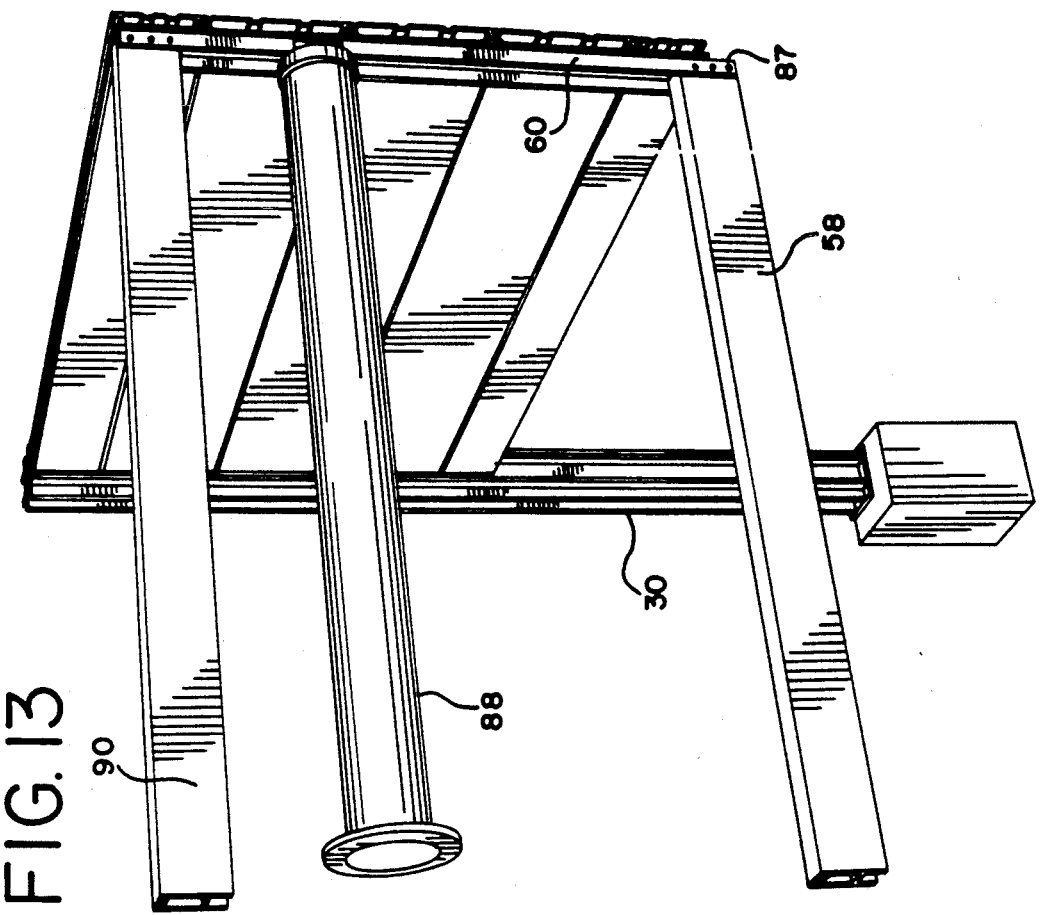
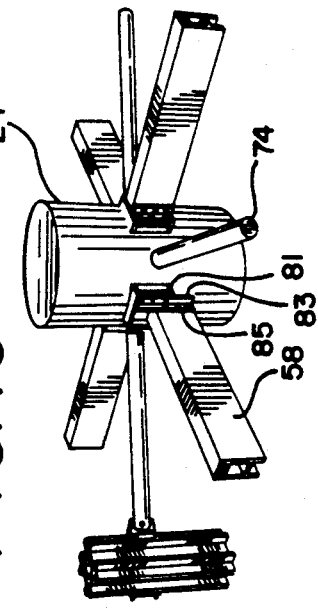
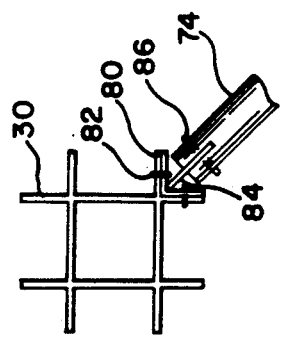
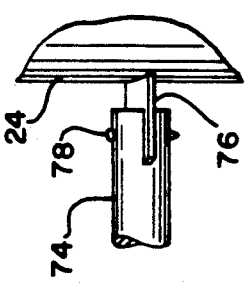
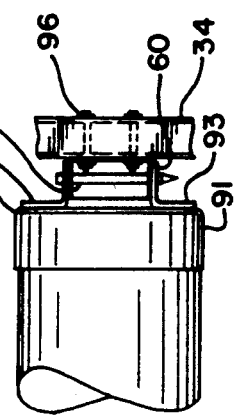

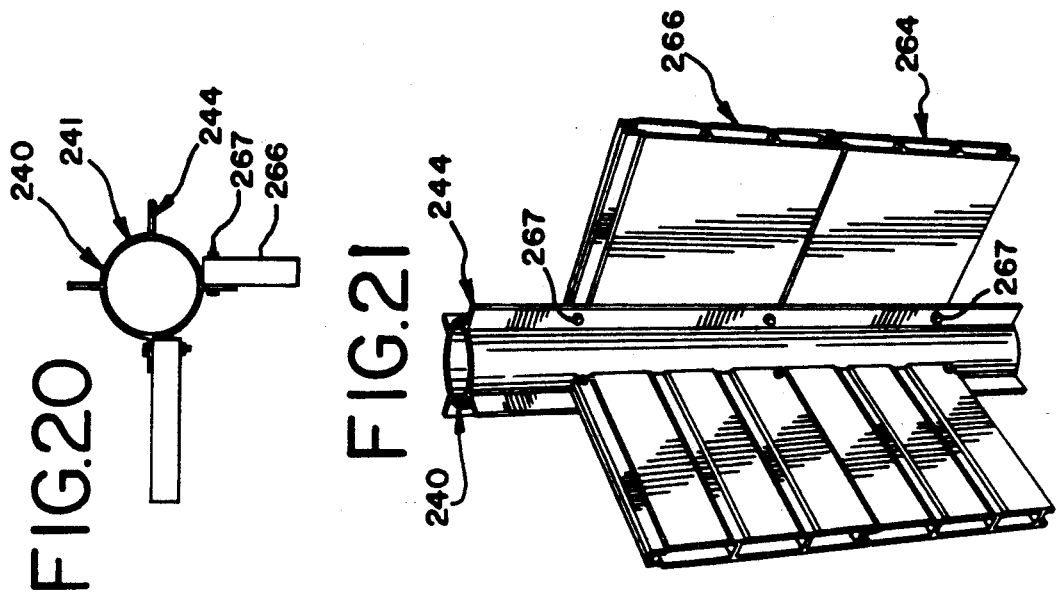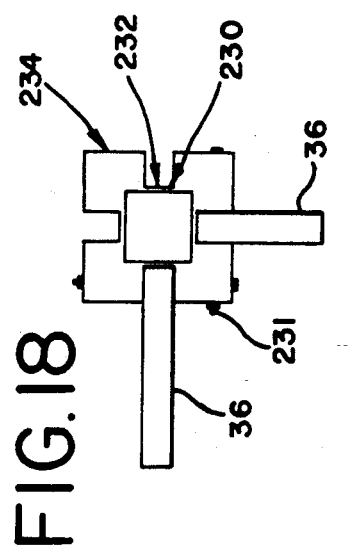

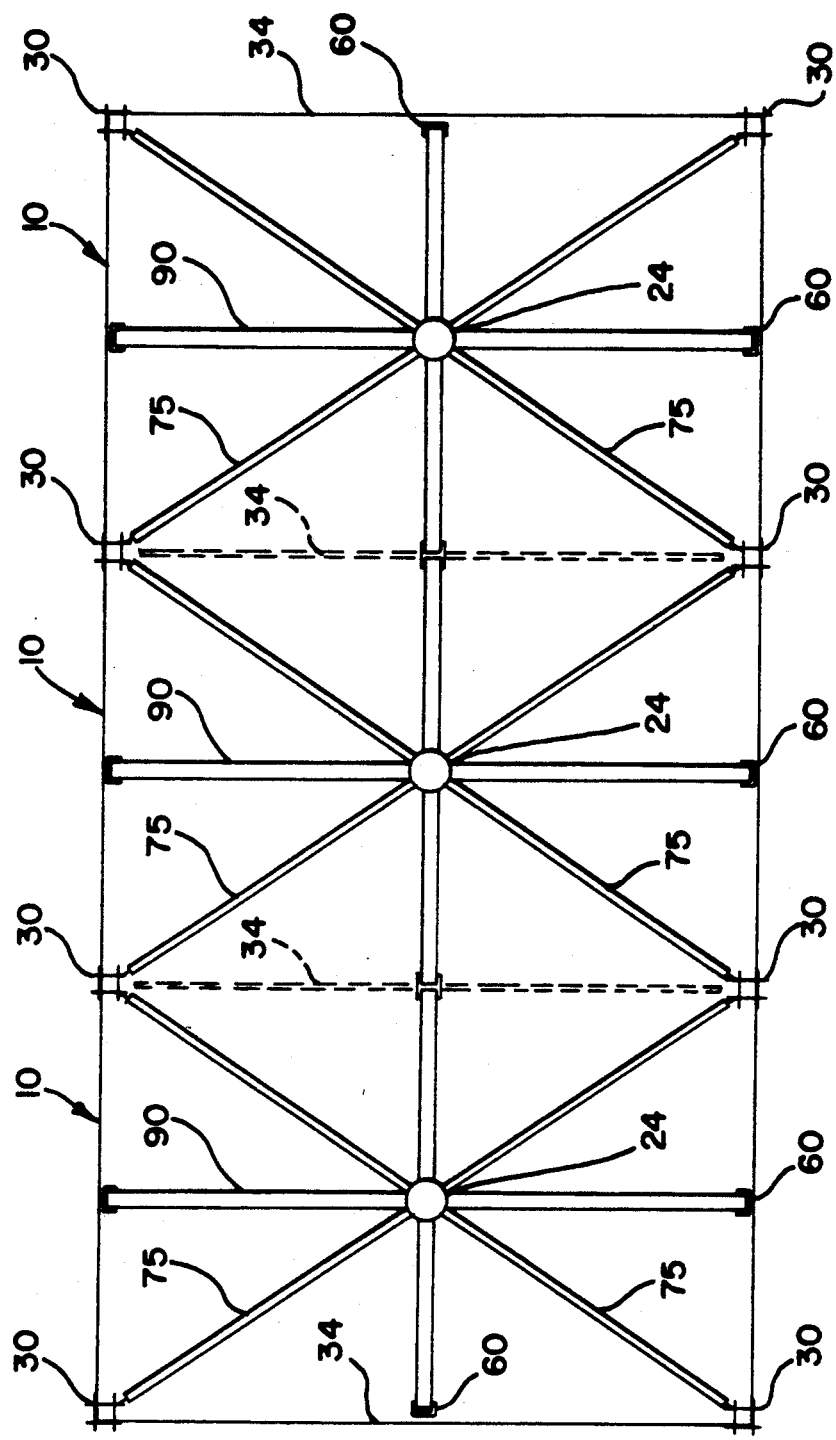

STRUCTURAL ASSEMBLY

BACKGROUND OF THE INVENTION

The present invention relates to a structural assembly having vertically extending columns and wall panels extending between the columns, and more particularly, wherein at least two wall panels extend between adjacent columns and the wall panels are joined to each other to form a structural wall assembly between adjacent columns.

The structural assembly of the present invention may be used for many different buildings, including electronically invisible structures, but is mainly designed to be utilized in a cooling tower or similar arrangement wherein air is drawn under said wall panels and then upward across a fill assembly to, both by direct contact and evaporation, cool a liquid, usually water, which is sprayed downwardly across a fill assembly. Because it is a goal of the present invention to provide a lightweight structural assembly, the fill associated with the structural assembly cooling tower of the present invention would usually comprise generally vertical parallel sheets of a plastic material such as polyvinyl chloride placed in a packed arrangement beneath the water spray headers.

Most cooling towers utilize a structural assembly to resist wind loads and earthquake loads and support dead and live loads, and as support of air moving equipment such as a fan, motor, gearbox and drive shaft or coupling and liquid distribution equipment such as distribution headers and spray nozzles and a heat transfer surface media such as a fill assembly. Due to the corrosive nature of the great volumes of air and water drawn through such cooling towers, it has been the past practice to either assemble such towers of stainless steel or galvanized and coated metal or, for larger field assembled towers, to construct such cooling towers of wood, which is chemically treated under pressure, and/or concrete at least for the structure of the tower. As mentioned above, metal parts of such cooling towers are subject to corrosion at varying degrees depending on the actual metal utilized and the coating material used to protect the metal. Further, such metal towers are usually limited in size and also somewhat expensive, especially in very large applications such as to cool water from an electric power generating station condenser. Pressure treated wood structure towers themselves are less expensive than metal or reinforced concrete towers, but may require extensive fire protection systems and have limits on their projected useful lives, due to a variety of decaying processes.

A cooling tower utilizing plastic structural elements is disclosed in U.S. Pat. No. 5,028,357, assigned to the assignee of the present application. That patent discloses a cooling tower comprised of structural plastic and fiberglass composite elements with a central structural hot water inlet main riser pipe.

SUMMARY OF THE INVENTION

It is an object of the present invention to provide an improved windload, deadload and liveload resisting frame concept or structural assembly that is adapted for use as a cooling tower. The improved structural assembly utilizes wall panels that are connected to each other to form a load-bearing structural wall assembly between adjacent vertically supported columns.

It is also an object of the present invention to provide an improved structural assembly wherein a central column or pipe riser is provided and diagonal braces from such central riser extending outwardly to said vertically extending corner columns to provide a lightweight but strong and stable wind resisting structural assembly.

It is also an object of the present invention to form the structural columns, wall panels and beams of pultruded fiberglass reinforced resin. Such a construction results in a lightweight, strong and extremely corrosion resistant structure.

The structural assembly of the invention includes at least four vertically extending corner columns wherein such columns are usually comprised of a pultruded fiberglass reinforced resin. It is most usual for the structural assembly of the present invention to comprise four sides resulting in a square or rectangular structural assembly. However, a five, six or more sided structure with an appropriate number of vertically extending corner columns is also seen as part of the present invention and may be more frequently used for magnetically-invisible structures envisioned for use. Further, each column includes a closed center portion with flange portions for strength improvement and attachment convenience extending outwardly therefrom. The preferred arrangement for such column is a cruciform arrangement wherein flanges would extend in an orthogonally related arrangement to result in a square or rectangular column structure. However, it is possible for such columns to be designed with a five, six or more sided center portion, or even a round center portion, with flanges extending outwardly therefrom to strengthen such center portion and also allow flange connection of the assembly of walls in the appropriately required configuration to result in the five, six or more sided structure. Assuming that a four sided structure is most often utilized, each common directional flange portion would be formed by a pair of parallel flanges, and with four sets of orthogonally related parallel flanges. Wall panels extend between adjacent vertically extending columns. Most typically, a wall section would comprise an upper wall section adapted to receive a roof at an upper portion thereof, a bottom or lower section wall panel and perhaps one or more intermediate or spacer panels. Accordingly, at least two but usually three or more wall panels would be vertically stacked and would also be tied to each other by connecting means such that the stacked wall panels join to form a contiguous structural wall assembly. The ends of all such stacked wall panels extend into the space between facing pairs of parallel flanges of adjacent vertically extending columns and are tied thereto by appropriate connecting mechanism, such as pins.

To further strengthen and stabilize the structural assembly of the present invention, diagonal braces extend inwardly from vertically extending corner columns to a central column or riser. The central riser typically is comprised of a round steel structural tube or pipe well known for its extreme strength and related structural properties. Again assuming that the structural assembly is a four sided assembly, each of such braces would be a diagonal from each corner vertically extending column to the centrally located riser. Of course in a five or more sided structure the braces would extend inwardly to the riser from each of the outer corner vertical columns. In such a structure which could have side dimensions from twelve to twenty-four feet, or more, and wall panel heights of from 4 to 16 feet or more, wind load becomes a concern. It has been found in the present invention that wind shear load on one wall is readily shared by the vertically extending columns but more principally by the central riser column due to the load transfer of beams and by diagonal braces both pushing against the riser in compression, and by the diagonal braces opposite the wall sharing the wind load by pulling in tension against the central riser. Further, said beams, of pultruded fiberglass reinforced resin, are also utilized in a transverse relationship with each of the wall panel assemblies such that beams extend from a center portion of each of the wall panel assemblies inwardly to the central riser. Such beam configuration aids in the wind load sharing previously described. Also, a distribution pipe manifold which spans between at least two wall panels and a central column or riser pipe may also aid in transferring a portion of windload from the wall panels to the central column or riser pipe.

It is also part of the present invention to arrange such structural assemblies in side by side configuration where two, three, four or more structural assemblies or portioned separate buildings or cells would share common walls and columns. Such an arrangement is especially desirable when each structural assembly includes the components of a cooling tower, and by arranging such assemblies in such configurations, tremendous cooling tower capacity can be provided. Such cooling tower arrangements are typically referred to as multi-cell cooling tower assemblies. One wall panel assembly between adjacent cells would be referred to as a partition or common wall, and would normally include additional panels extending downwardly into the air entry space below a normal wall to assure that water is not blown between adjacent cells. Further, such adjacent cells would share vertically extending columns at the cell border.

BRIEF DESCRIPTION OF THE DRAWINGS

In the drawings,

FIG. 6 is a detail of the inside of a wall panel assembly with roof support lintel and fill lintel shown;

FIG. 7 is a detail of upper wall panel and associated roof lintel and roof lintel bracket;

FIG. 8 is a side view of a lintel beam bracket;

FIG. 9 is a detail view of connection bracket between fill support beam and a fill support lintel;

FIG. 10 is a detail of an upper portion of the central riser and associated beams and diagonal braces;

FIG. 11 is a detail of the connection between diagonal brace and riser;

FIG. 12 is a detail cross sectional view of the diagonal brace to vertical column connection;

FIG. 13 is a detail inside view of a partial wall panel assembly showing mid-panel connection details of the distribution header and beam connections;

FIG. 14 is a detail partial view of the distribution header to wall panel channel connection;

FIG. 18 is a first alternate column cross section view;

FIG. 19 is a perspective view of a wall panel connection to the first alternate column;

FIG. 20 is a second alternate column cross sectional view;

FIG. 21 is a perspective view of a wall panel connection to the second alternate column;

FIG. 22 is a top view in cross section of first embodiment a multiple cell building or cooling tower;

DETAILED DESCRIPTION

Figure 1:
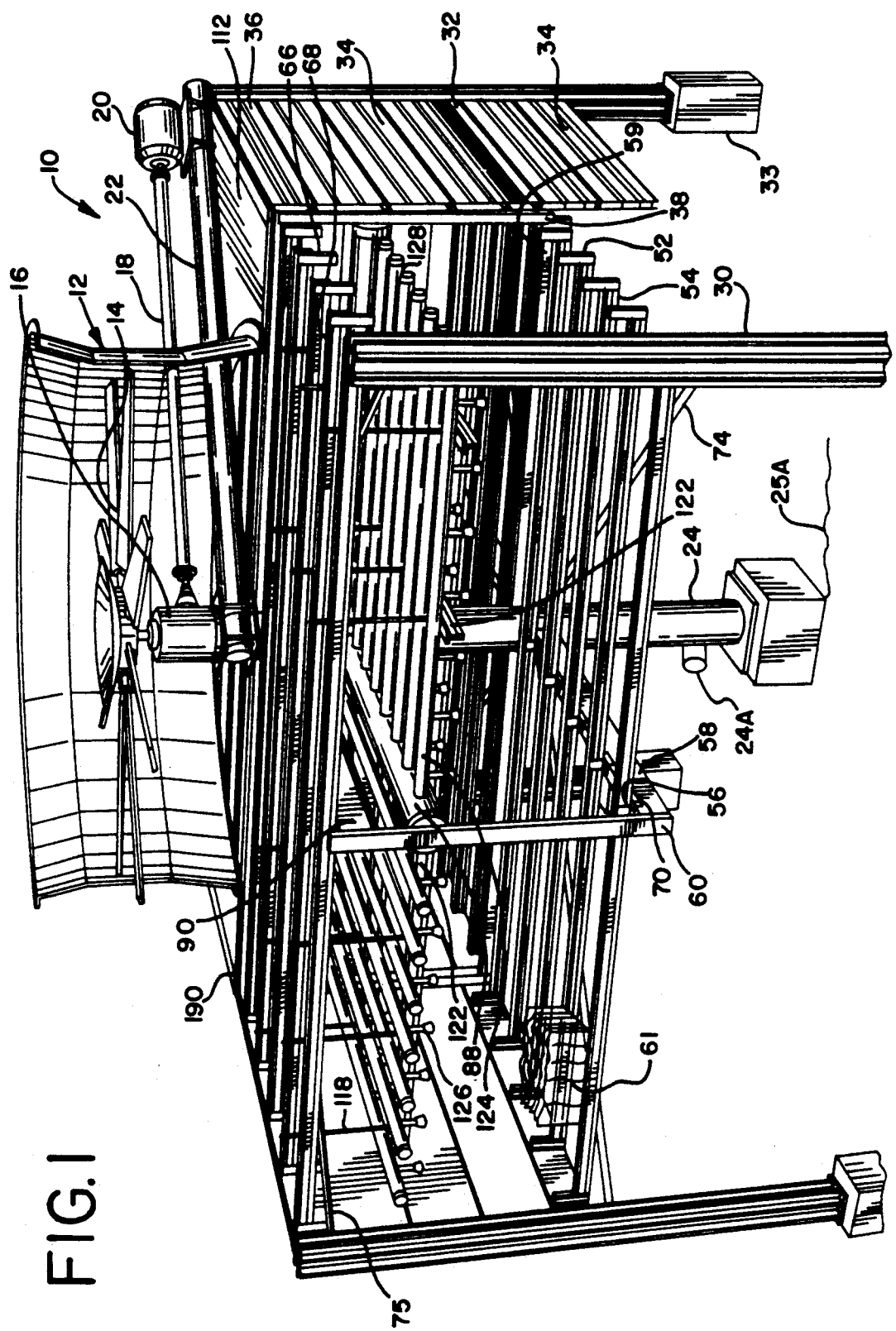
FIG. 1 is a perspective view, in partial cross section, of a structural assembly in accordance with the present invention forming a cooling tower.

In FIG. 1 a structural assembly in accordance with the present invention is shown at 10 in the preferred form of a cooling tower. Cooling tower 10 includes fan stack 12 which is usually comprised of a conventional formed fiberglass structure which usually is assembled on top of cooling tower 10. Fan 14 is of a conventional propeller blade type wherein blades can be adjusted to a desired degree of pitch to accommodate various fan speeds and motor power levels. Fan 14 sits atop geared fan-speed reducer 16 which itself receives drive shaft 18 extending from fan motor 20. Fan motor 20 and gear reducer 16 are themselves mounted to drive beam 22 which is usually comprised of a steel tube or pipe of appropriately chosen structural characteristics such as bending and shear strength and torsion resistance. Although motor 20 and drive beam 22 are shown outside of the roof or on top of the roof of cooling tower 10, it should be known that such fan drive components can be located under the roof of the cooling tower if so chosen. Further, motor 20 can be located closer to fan shroud or inside fan shroud and a ventilated housing could be built about motor 20 if so desired. The purpose of fan 14 is to draw air upwardly through the cooling tower structure with the air entering the cooling tower structure 10 from the lower open side sections of cooling tower structure 10, below panels 34.

Central column riser 24 is shown as a hollow structural column, and is usually comprised of steel. Riser 24 is attached to riser base plate 27 which is in turn extends from riser base 25. Although the details of the base construction are not shown, it is well know that riser base 25 is usually of a concrete construction which extends from or forms part of the concrete floor 25A, and may have appropriate substructure to resist wind loads. The concrete floor itself forms entire base on which cooling tower structure 10 is supported. Further, a concrete perimeter floor-wall is usually provided to form a known collection basin for cooled water which in turn is pumped to process load. It is also known that riser 24 includes inlet 24A and internal piping to receive a supply of water or other liquid to be cooled in cooling tower structure 10. The usual way of inleting such water is disclosed in U.S. Pat. Nos. 4,543,218, and 5,028,357 also assigned to the assignee of the present invention.

One end of drive beam 22 is seen to rest on top plate 29 of riser 24. Gear reducer 16 rests on gear reducer base plate 31 which itself is supported by beam 22 and tied to riser top plate 29 for additional structural strength.

Vertical structural columns 30 extend upwardly from bases 33. Column bases 33 usually are formed of a concrete structure and, similar to riser base 25, are part of the overall concrete basin structure that supports cooling tower structure 10. Columns 30 are, in a square or rectangular cooling tower structure 10, usually of a cruciform cross section, and comprise a closed central section with flanges extending outwardly therefrom.

As seen in FIGS. 18-21, alternative column constructions are also part of the present invention. FIGS. 18-19 show a first alternate column 230 comprising a center open or hollow square section 232 with corner structures 234 extending the length of the corners of column 230. Upper wall panel 36 and spacer wall panel 34 are received in spaces between adjacent corner structures 234, and are held by pins 231 that extend through aligned openings in corner structures 234 and upper wall panel 36 and spacer wall panels 34. FIGS. 20-21 show a second alternate round column 240 comprising a center round column 241 with flange 244 extending the length of round column 240. Upper wall panel 266 includes aligned openings through which connecting pins 267 pass to connect upper wall panels 266 to one of flanges 244. Spacer wall panels 264 are similarly connected to one of flanges 244. Columns 230 and 240 are comprised of pultruded fiberglass reinforced resin, though column 240 may also be comprised of steel pipe and plate components for specialized applications.

Figure 2:
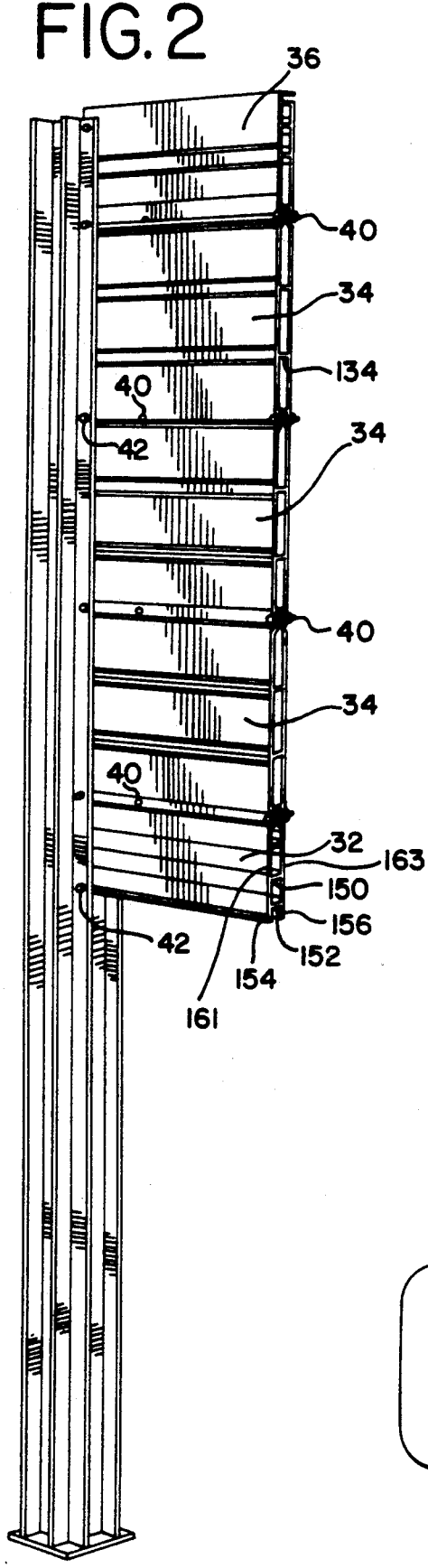
FIG. 2 is a detail of the wall panel-column connection.
Figure 3:
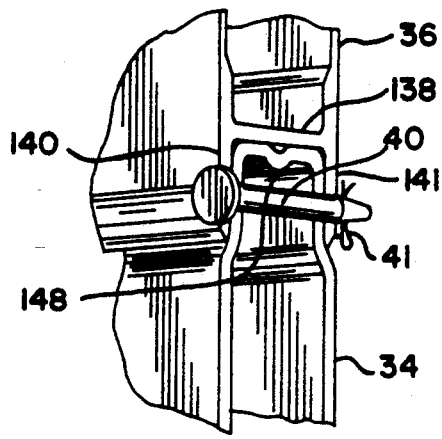
FIG. 3 is detail of the wall pan 1 to wall panel and pin connection.
Figure 4:
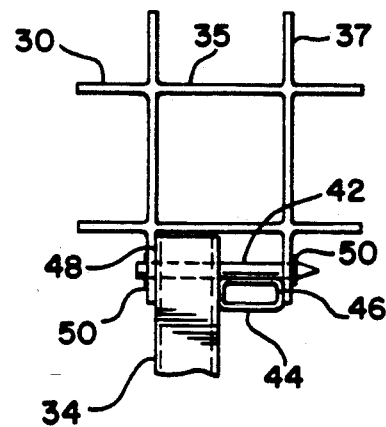
FIG. 4 is a plan view of the wall panel-column connection.
Figure 5:
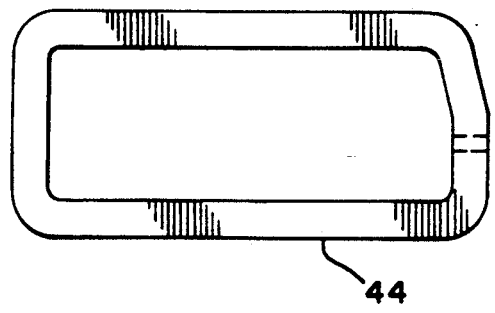
FIG. 5 is a detailed cross section view of a typical hollow-type wall panel filler.

Referring to FIGS. 2-4, it is seen that column 30 comprises a central structure 35 with flanges 37 extending therefrom. In a five, six or more sided cooling tower structure, flanges 37 would be arranged such that columns 30, while at the corners of the cooling tower structure, would not necessarily be orthogonally related to allow the proper directional attachment of the wall panel assemblies. However, in the arrangement shown in FIG. 1 and chiefly described herein, cooling tower structure 10 is described as a square structure with orthogonally related walls. Accordingly, columns 30 have orthogonally related flanges 37 extending therefrom. Further it is possible for central structure 35 of column 32 to be a round or multiple sided polygonal structure. However, the most frequently chosen embodiment for column 30 is to have central structure 35 as a square structure.

A wall panel assembly extends between adjacent vertical columns. Each wall panel assembly includes an upper wall panel 36 having ends received between oppositely facing flanges 37 on adjacent columns 30. One or more spacer or intermediate wall panels 34 are located beneath upper wall panels 36; intermediate wall panels 34 also have ends extending into and received in oppositely facing flanges 37 extending from adjacent columns 30. Finally, lower wall panel 32 also extends between adjacent columns 30 and has ends that are received in the space between parallel facing flanges 37 extending from adjacent columns 30.

Referring specifically to FIG. 4, intermediate or spacer wall panel 34 is seen to be received between flanges 37 of column 30. As the space between flanges 37 is greater than the width of intermediate wall panel 34, it is necessary to insert a panel filler 44 between one side of intermediate wall panel 34 and the opposite facing column flange 37. After forced wedging of filler 44, a pop rivet 46 is utilized to extend through aligned openings in column flange 37 and panel filler 44 to hold panel filler 44 in place. Further, tacky tape or similar material 48 is inserted between the other face of intermediate wall panel 34 and the adjacent column flange 37. This assures a water tight fit between intermediate wall panel 34 and column flange 37. Finally, column pin 42 extends through aligned openings in adjacent, parallel column flanges 37 and intermediate wall panel 34 to affix and attach intermediate wall panel 34 to column 30. A snap ring lock 50 is used over each end of column pin 50 to be received in a groove therein to hold column pin 50 within column flanges 37. The openings in both column flanges 37 and intermediate wall panel 34 are larger in diameter than the diameter of 42 to assure a ready fit of column pin 42 therethrough. Lower wall panels 32 and upper wall panels 36 are affixed to column 30 in a similar manner.

Figure 15:
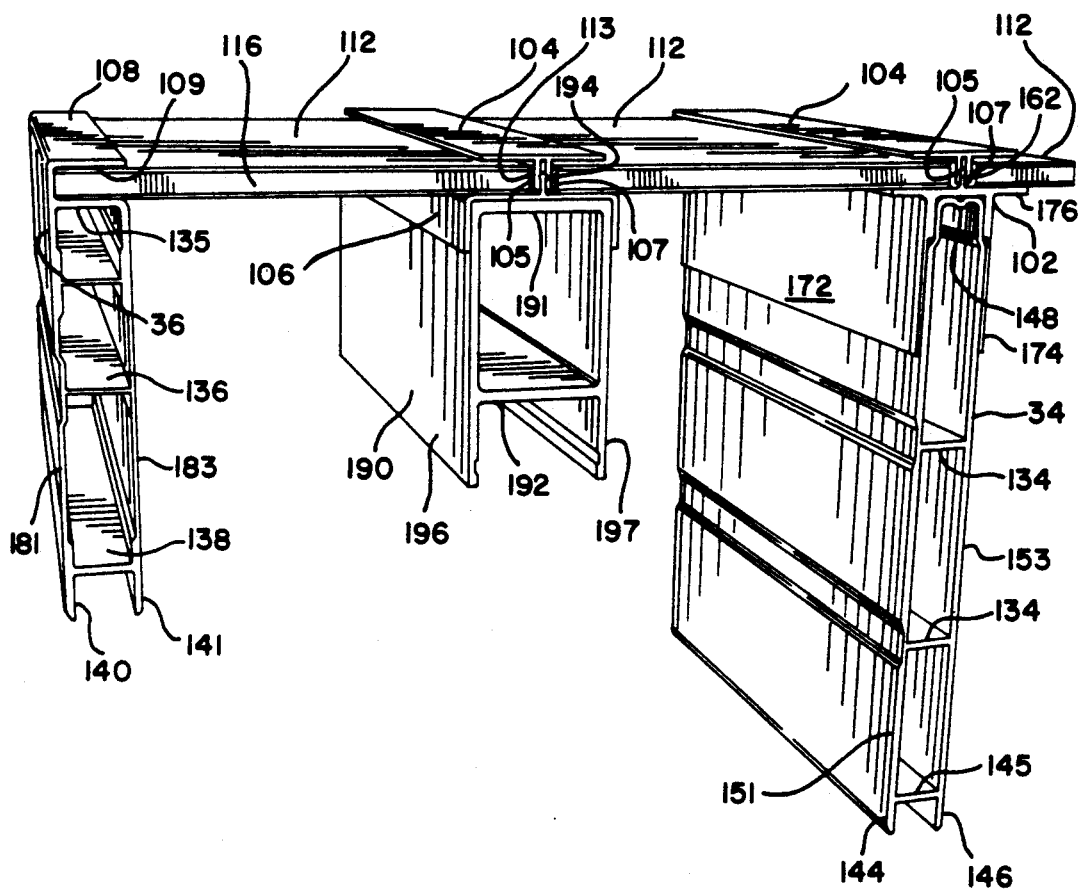
FIG. 15 is a detail partial view of the roof panel assembly with connections to the upper wall panel, roof beam, and common or partition wall.

Referring also to FIG. 15, upper wall panel 36 is seen to comprise two spaced parallel side panel sections 181, 183 joined by upper panel rib 136 and upper panel lower rib 138. Extending downwardly from lower section of side panel section 181, 183, of upper wall panel 36 are parallel flanges 140 and 141 forming a space therebetween. Further, upper panel top rib 135 joins the spaced wall sections of upper wall panel 36. Further, deck flange 108 extends above upper panel top rib 135 to form a deck pocket 109 at the top of upper wall panel 36.

Intermediate or spacer wall panel 34 is seen to be comprised of spaced parallel side panel sections 151, 153 joined by intermediate wall ribs 134 and lower rib 145. Extending downwardly from lower sections of side panel sections 151, 153 below lower rib 145 are parallel flanges 144 and 146 which are spaced to form an opening therebetween. Further, intermediate wall panel top rib 148 joins the parallel space wall sections at the top of wall panel 34. It is seen that intermediate wall panel 34 adjacent top rib 148 is of a reduced spacing than the normal distance between walls 151,153 of intermediate wall panel 34. It should be pointed out that intermediate wall panel 34 shown in FIG. 15 is shown as part of a partition wall panel between adjacent fan multiple cells of cooling tower structure 10. However, intermediate wall panel 34 shown in FIG. 15 though generally of lighter weight is identical in structure concept to intermediate wall panel 34 of FIGS. 1 and 2.

Referring specifically to FIG. 2, lower wall panel 32 is also seen to be comprised of spaced parallel side panel sections 161, 163 separated by a plurality of lower wall panel ribs 150. Further, lower wall panel 32 includes parallel lower wall panel flanges 154 and 156 extending downwardly from side panel sections 161, 163 in a spaced arrangement to form an opening therebetween.

Referring specifically to FIG. 3, panel pin 40 is seen to be placed through aligned openings in upper panel flanges 140 and 141 and the narrowed-width upper section of intermediate wall panel 34. Pin 40 is held in place by a cotter-pin clip 41 through an opening near the end of pin 40. Similar connections with pins 40 occur in a spaced relationship along the length of the connection between upper wall panel 36 and intermediate wall panel 34, between intermediate wall panels 34 themselves and between intermediate wall panel 34 and lower wall panel 32. It is desired that such pin connection be made approximately every one to four feet along the length of the appropriate wall panel sections. Further, the openings in the panels for pins 40 are larger in diameter than the pins.

Figure 26:
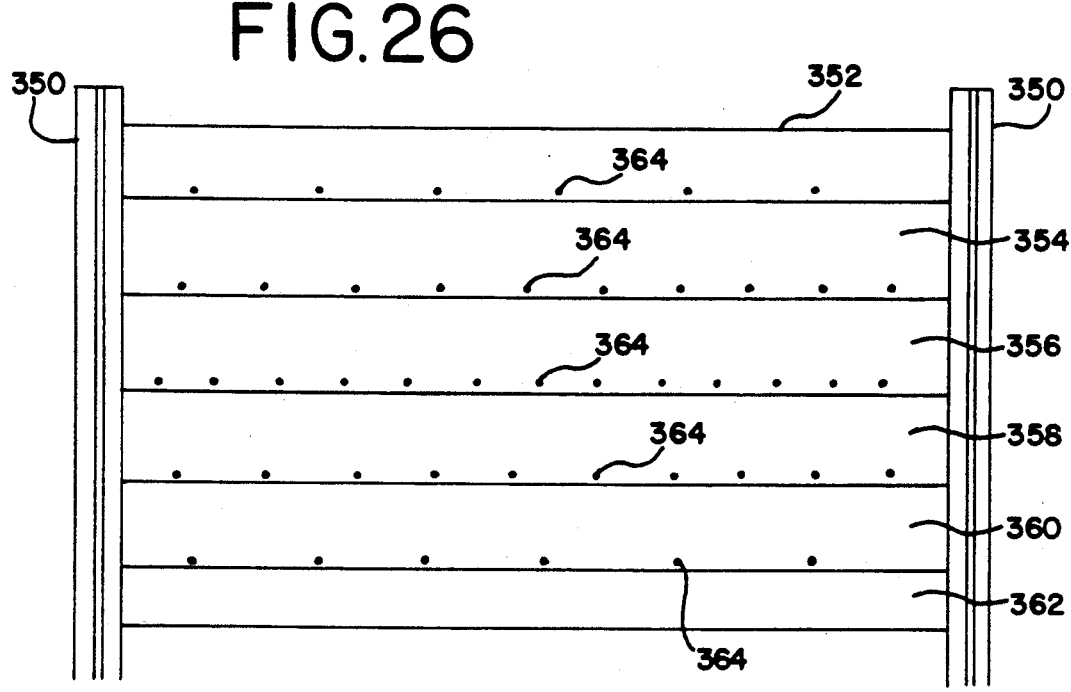
FIG. 26 is a side view of a wall panel assembly.

Referring to FIG. 26, a typical wall panel assembly in accordance with the present invention is shown. Vertical corner columns 350 are shown with an upper wall panel 352 extending therebetween, with spacer wall panels 354, 356, 358, and 360 stacked below upper wall panel 360. Connecting pins 364 extend through aligned openings in the junctions between adjacent wall panels. The details of the junctions will not be set forth here in the interest of brevity, but are similar to the above described junctions between upper wall panel 36, spacer panel 34 and lower panel 32. However, it is part of the present invention that, in handling the tremendous horizontal wind shear loads that can be placed adjacent such a wall assembly of twenty-four or more feet in length, the number and placement of connecting pins 364 is seen to affect the shear load strength. A greater number of connecting pins is desired near the vertical center of the wall assembly. For example, in the embodiment shown in FIG. 26, there are over double the number of connecting pins 363 along the junction between the center adjacent spacer wall panels 356 and 358 than there are between either upper wall panel 352 and adjacent spacer wall 354 or between lower wall panel 362 and adjacent spacer wall panel 360.

Referring to FIG. 6-9, details of roof lintels 68 and fill lintels 54 are shown. The plurality of roof lintel brackets 66 are attached to upper wall panel 36 by lintel bracket bolts 64 extending through an opening in the base of roof lintel brackets 66 and aligned openings in the walls and upper panel flanges 140 and 141 of upper wall panel 36. Roof lintel brackets 66 are comprised of a formed metal channel having a base section and two raised flanges. Roof lintels 68 themselves are of a structural shape, usually a tee, and are usually comprised of a pultruded fiberglass reinforced resin. An end of each roof lintel 68 extends into roof lintel bracket 66 and received therein by lintel pin 62 which passed through aligned openings in roof lintel brackets 66 and the lower section of roof lintel section 68. In certain applications, roof lintels 68 could be replaced by beam sections similar to roof support beams 90, for certain application where increased strength is required.

In a similar manner to roof lintel brackets 66, bottom or fill lintel end brackets 52 are affixed to the inner or inside wall of the lower wall panel 32. Lintel end brackets 52 are comprised of a metal channel having a base end and two raised flanges quite similar to roof lintel bracket 66. The bottom lintel end bracket 52 has openings which are aligned with openings through the side walls of lower wall panel 32 and are affixed thereto using bolts similar to lintel bracket bolts 64. Fill lintels 54 are similar to roof lintel 68 in that they are a unique structural shape, similar to a tee, and are usually comprised of pultruded fiberglass reinforced resin. The ends of fill lintels 54 are received between the flanges of bottom lintel end brackets 52 and are held thereto by pins that pass through aligned openings in the base section of fill lintels 54 and the flanges of bottom lintel end brackets 52. Fill lintels 54 pass across the top of fill support beam 58 and are held thereto by passing across lintel beam brackets 56. Lintel beam brackets 56 are usually a double inverted saddle shaped structure of metal, top section 57 of which receives the base section of fill lintels 54 and bottom perpendicular section 59 of which overlaps the top of fill support beam 58. Lintel beam brackets 56 are held to beam 58 usually by pop rivets 70 which extend through aligned openings in the bottom section 59 of lintel beam bracket 56 and beams 58. In certain applications, fill lintels can be replaced by lighter beam sections similar to fill support beams 58.

Referring chiefly to FIG. 1, it is seen that roof lintels 68 extend transversely across the entire length of cooling tower assembly 10, thereby extending between opposite facing wall assemblies. Similarly, fill lintels 54 extend across the entire length of cooling tower assembly 10 between the same wall assemblies. Further, note that fill material 61 is stacked on top of and is supported by fill lintels 54. Fill material 61 itself is usually comprised of multiple generally vertical sheets of polyvinyl chloride material and is generally installed in cooling tower assembly 10 in combined blocks to ease assembly. Such blocks are received across and supported by at least two fill lintels 54. It is obvious fill material 61 rests on its edge to allow both water or other liquids to be cooled to drain downwardly across fill material 61 and to allow air to be drawn upwardly across fill material 61 and to exit from fan stack 12.

Referring now to FIG. 1 and FIGS. 10-12, details of the supports extending from riser 24 are shown. In particular, lower diagonal braces 74 extend from central riser 74 to each of columns 30 at a location generally below fill lintel 54. In addition, upper diagonal braces 75 extend from riser 24 to each of columns 30 at a location generally just below roof lintels 68. Diagonal braces 74 and 75 most typically are comprised of tubing or a steel pipe, with one end of the brace attached by a brace bolt 78 passing through aligned openings in the brace and through a receiving opening in riser bracket 76. Note also that riser bracket 76 fits into a slot in diagonal 74. Riser bracket 76 itself could be affixed to riser 24 by welding or be part of a ring clamp that surrounds riser 24 to permit ready vertical movement positioning of bracket 76. The other end of diagonal 74, with a similar connection for end connection of diagonal 75, is shown specifically in FIG. 12 wherein an angle bracket is attached between adjacent right angle related flanges of column 30. Openings in the legs of angle bracket 80 are aligned with openings in the flange sections of column 30 and bracket bolts 82 are extended therethrough. Further, bracket extension 84 extends from the joint of angle bracket 80. Bracket extension 84 is seen to extend into a slot in the end of diagonal 74 (or 75) and is held therein by bolt 86 which extends through aligned transverse openings through diagonal brace 74 (or 75) and an aligned opening in bracket extension 84. Bracket 80 is most typically comprised of steel, usually a galvanized steel or else an appropriately chosen alloy of stainless steel.

Referring also to FIGS. 13 and 14, fill support beam 58 is shown extending between riser 24 and wall panel channel 60. Fill support beam 58 extends just below fill lintels 54 in order to support a center portion of fill lintels 54 thereon. Further, it is also possible for fill lintels 54 to comprise two different sections, one extending from the appropriate wall panel assembly to fill support beam 58, and the other extending from fill support beam 58 to the opposite wall panel assembly. Fill support beam 58 is seen to be connected at its one end to riser 24 by a bracket assembly including base bracket 81 which is affixed to riser 24 by means such as welding and a section bracket 83 which is bolted to base bracket 81. The walls of fill support beam 58 include openings that are aligned with opening in section bracket 83 to receive bracket bolts 85 therethrough to thereby hold the end of fill support beam 58 to riser 24. The other end of fill support beam 58 is received between the edges of wall panel channel 60 and includes openings that are aligned with openings in wall panel channel 60 such that channel pins 87 pass therethrough to thereby hold the end of fill support beam 58 to wall panel channels 60. In a similar manner to fill support beam 58, roof beam 90 includes an end attached by similar bracketing to riser 24 and by a similar aligned hole and pin arrangement to wall panel channel 60. Together, fill support beam 58 and roof beam 90 provide lateral support strength to the wall panel assembly. It will be understood that there are four fill support beams 58 in cooling tower structure 10 embodiment shown in FIG. 1. Similarly, there are four roof beams 90 in cooling tower structure 10 embodiment of FIG. 1, with each of fill support beam 58 and roof support beam 90 extending between riser 24 and a different wall section. There can be more than four fill support beams or roof support beams for a larger size cooling tower structure having more than four side walls and more than four columns at the panel wall boundary.

Riser 24 includes the capability to accept water or other liquids to be cooled near its base 25 to bring such water upwardly through riser 24 to near the top thereof where distribution headers 88 are attached and extend therefor. Such water distribution means usually is internal within riser 24 and would include piping or an appropriate connection to the inside of riser 24 whereby such liquid is brought within the interior of hollow riser column 24. Distribution headers 88 are usually four in number but may be as few as two, for each cell or cooling tower structure 10. Each distribution header extends outwardly to a wall assembly and includes an end that is received in distribution header bracket 92. Distribution bracket header 92 includes a cup-shaped section 91 which receives an end of distribution header 88. Most typically, distribution headers 88 are comprised of fiberglass or plastic tube or pipe, but a structural metal pipe could be utilized as well. Distribution header brackets 92 include a cup shaped element which receives the end of distribution header 88 as well as angle sections 93 and 95 at the back of the cup section 91. Angle sections 93 and 95 are positioned such that they are aligned with the edges of wall panel channel 60. Openings in angle sections 93 and 95 are aligned with openings in wall panel channel 60 such that distribution header pins 94 are placed therethrough to hold distribution header bracket 92 thereto. Additional distribution header bracket bolts or pins with retainer clips 96 can be utilized to extend through wall panel channel 60 and through wall panel channel section 34.

Referring now to FIG. 1, a plurality of lateral distribution pipes 124 extend transversely from distribution headers 88 It is seen that each set of lateral distribution pipes 124 extend in one direction from distribution header 88 to cover basically one-fourth of cooling tower structure 10, although a two-manifold version will have pipes 124 extending in two directions to each cover one-half cell of cooling tower structure 10. This arrangement could be modified in various fashions. The plurality of spray nozzles 126 extend downwardly from lateral distribution pipes 124. Water to be cooled accordingly flows upwardly through riser 24, outwardly through distribution headers 88, into lateral distribution pipes 124 and then downwardly and out in a spray fashion from spray header 126. Further, lateral end caps 128 are affixed to the end of each lateral distribution pipe 124. Such lateral end caps 128 are usually adjacent wall panels 34 and can be held thereto by affixing such end caps to a bracket that is affixed to an inside surface of the wall panel to hold and support lateral end cap 128 and, in turn, lateral distribution pipe 124.

Further support for lateral distribution pipes 124 is provided by distribution support lintels 122 which extend transversely below lateral distribution pipe 124. Distribution support lintels are typically of a structural shape, usually a tee, and are usually comprised of a pultruded fiberglass reinforced resin. Distribution support lintels 122 themselves are supported by a plurality of hangers 118 which extend downwardly from roof lintels 68. Accordingly, distribution support lintels 122 are supported by roof lintels 68. Hangers 118 are typically metal rods or composite reinforced resin rods appropriately bolted at one end to each roof lintel 68 and at the other end to distribution support lintels 122.

Figure 16:
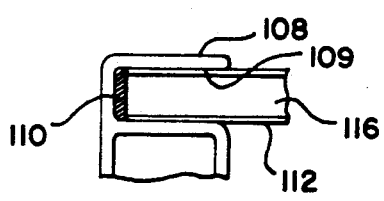
FIG. 16 is a detail cross section of the roof panel-to-upper wall panel connection.
Figure 17:
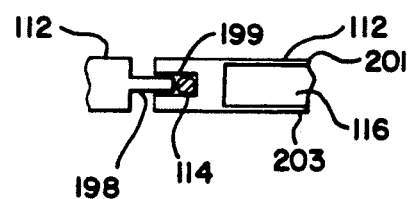
FIG. 17 is a detail cross section of a roof panel to adjacent roof panel connection.

Referring now to FIGS. 15-17, a detail of the roof section of cooling tower structure 10 is shown. It should be understood that in the view of FIG. 15, wall panel section 34 is utilized as a common wall between adjacent cells, 10 of multi-cell cooling tower structures. As mentioned above, it may be desirable in certain applications to utilize several cells of cooling tower structures 10 in a side by side relation; in such arrangements, a common wall will be utilized between each cell of such similar cooling tower structures. In such an arrangement, as shown in FIG. 1, additional intermediate or spacer wall panels 34 may be extended below lower wall panel 32 to keep water and air from passing between adjacent cooling tower structures. In such an arrangement upper wall panel 36 would not be utilized in the common wall, but rather an additional intermediate wall panel 34 would extend upwardly as the top wall section as shown in FIG. 15. Referring now to FIGS. 15-17, such intermediate wall 34 is seen to be comprised of base parallel walls 151, 153, with intermediate cross ribs 134 extending therebetween. Lower cross rib 145 forms the bottom of intermediate wall panel 34, with spaced flanges 144 and 146 extending downwardly therefrom. Upper rib 148 joins spaced parallel walls 151 and 153 at the top of intermediate wall panel 34, and it can be seen that upper sections of spaced parallel walls 151 and 153 adjacent top rib 148 are of a reduced spaced distance. Such reduction in spaced distance assist in the placing of the upper portion of the intermediate wall panel 34 into panel top cap 102. Panel top cap 102 includes wall sections 172 and 174 which extend downwardly from top section 176 and further a ridge section 162 which extends upwardly from a center portion and runs the length of top section 176. Roof panel retainer 104 is placed on top of panel top cap 102 and includes downwardly extending flanges 105, 107 which form a space into which top ridge 162 of panel top cap 102 is fit. Accordingly, it is seen that adjacent roof panel sections 112 can be joined together at the common wall assembly described.

Along the other edges of cooling tower structure 10, wa panels 36 form the top of the wall panel assembly. Upper wall panels 36 themselves are comprised of spaced walls 181, 183. Intermediate rib 136 extends between spaced walls 181, 183, and bottom rib 138 extends between spaced walls near the bottom thereof. Flanges 140 and 141 extend beyond bottom rib 138. The spacing formed between flanges 140 and 141 allows the top section of an adjoining intermediate wall panel 34 to be inserted therein to form a wall assembly. Such wall assembly is shown best in FIG. 2. Upper wall panel 36 further includes top deck flange 108 extending upwardly from spaced wall 181 and extending crosswise parallel to top rib 135. Accordingly, deck space 109 is formed between top deck 108 and the upper portion of top rib 135.

In certain applications or specific locations it is desirable to utilize a roof support beam 190 in place of a roof lintel. Most frequently, such roof support beams are utilized parallel to lintels and in a central location equidistant between columns 30. Referring to FIG. 15, roof support beam 190 is seen to comprise lower rib 192 extending between spaced walls 196 and 197. Further, roof beam top rib 191 extends between the upper edges of roof beam side wall 196 and 197. Top beam cap 102 is seen to fit across the top of roof beam top rib 191 and extend downwardly across a partial length of roof beam side walls 196 and 197. Top beam cap 106 is seen to comprise cap ridge 194 which extends upwardly from a central portion of top beam cap 106 and runs the length thereof. Roof panel retainer 104, identical to previously described roof panel retainer 104, is placed such that roof panel retainer flanges 105 and 107 receive top beam cap ridge 194 therebetween. An opening is formed between the edges of roof panel retainer 104 and the top of top beam cap 106 such that edges of adjacent roof panels 112 are fitted therein. Foam or similar material spacer or backer bar 113 is provided adjacent flanges 105, 107 to allow thermal expansion and contraction between roof panels 112.

As seen in FIG. 16, roof panel 112 extends into space 109 at the upper portion of upper wall panel 36. Foam backer bar 110 is received in the inner lateral portion of spacer 109 such that roof panel 112 butts the backer bar 110 to create a seal therein and to allow for thermal expansion and contraction of roof panel 112.

Further, referring to FIG. 17, certain sections of the roof structure perpendicular to those just described, include joints between adjacent roof panel 112. Each such joint comprises a lengthwise tab 198 extending the length of roof panels 112. Such tab 198 is received into a lengthwise opening 199 in an adjacent roof panel 112, to both adequately seal the roof structure on the joint between adjacent roof panels 112, and to allow thermal expansion and contraction between adjacent roof panels, a foam roof panel backer bar 114 is included in the lateral edge of the lengthwise extending slot 199. Further, roof panel 112 is preferably a sandwich construction of pultruded fiberglass reinforced resin sections or layers 201 and 203, surrounding a core 116 section which is preferable comprised of a balsa wood. It is desired that the grain of such balsa wood runs the panel thickness direction or the width of the roof panels, which are typically two feet wide by anywhere from 8 to 24 feet in length. By having such grain run the thickness direction of the roof panels, maximum lengthwise and widthwise expansion is held to an extremely small amount, since the balsa material has very low thermal expansion coefficients perpendicular to grain direction, as opposed to grain direction. The construction of the roof structure as herein described results in a extremely strong roof structure capable of supporting the required loads in a flat roof cooling tower or other building type structures.

As shown in FIG. 22, it is possible to assemble a plurality of cooling tower structures 10 in a multi-cell arrangement. Such arrangement could be two, three or more structures in a row, or a side-by side and row arrangement.

As shown in FIG. 22, cooling tower structure 10 share common walls 34 and certain columns 30 as shown in FIG. 15. As the view is a top view without a roof structure or floor assemblies, certain risers 24, diagonal braces 75, beams 90 and wall panel channels 60 are shown.

Figure 23:
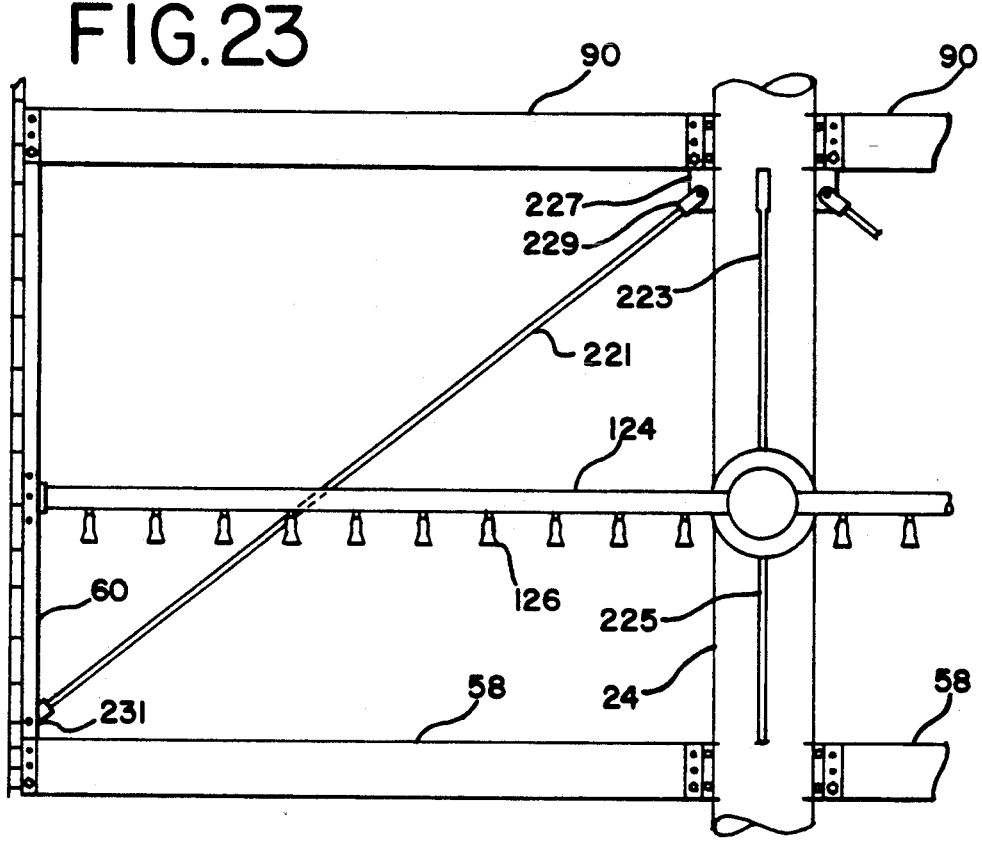
FIG. 23 is a partial side view of a suspension support extending from the riser to the wall panel.

Referring to FIG. 23, diagonal suspension supports 221 are seen to extend from bracket 227 near the junction of roof beam 90 and riser 24 to a connection with wall panel 60 just above fill support beam 58. Appropriate end brackets 229 and 231 are affixed to either end of suspension support 221 to permit pinned connection to bracket 227 and wall panel channel 60. Suspension support 221 most frequently comprises a steel rod, but can comprise a prestressed cable.

Figure 24:
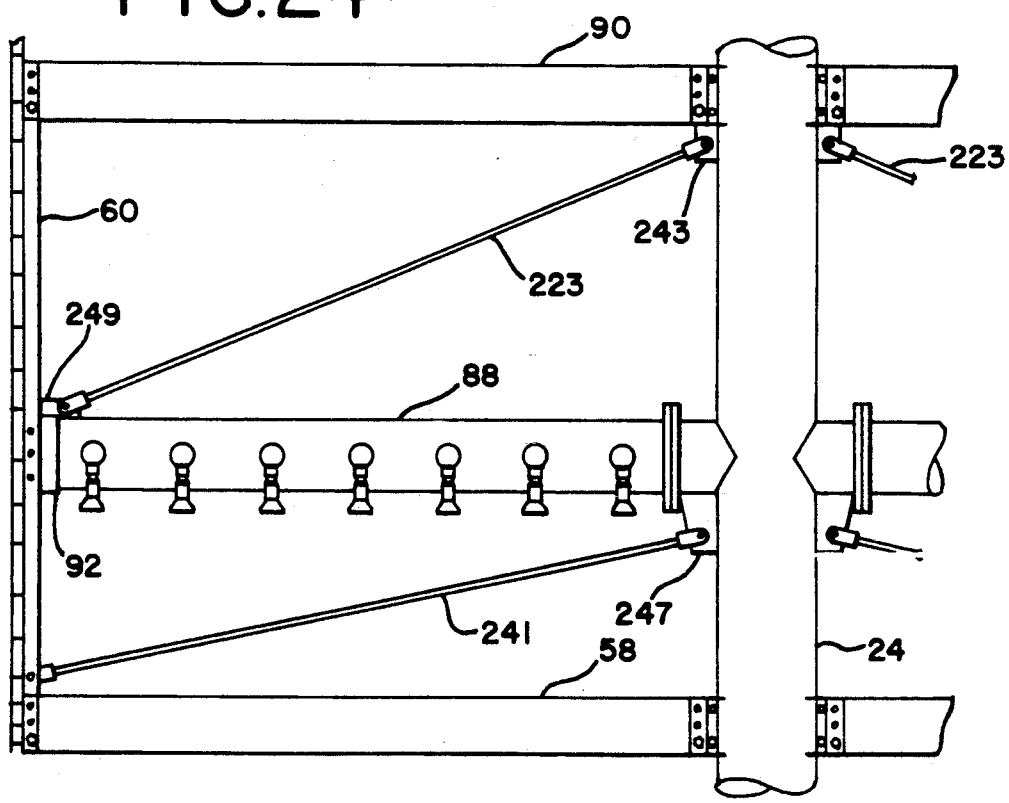
FIG. 24 is a partial side view of suspension supports extending from the riser to both the distribution header and to the wall panel to beam connection.

Referring to FIG. 24, upper diagonal suspension support 223 extends from bracket 243 near the junction of roof beam 90 and riser 24 to a connection with bracket 249 at the end of distribution header 88 at wall panel channel 60. Lower diagonal suspension support 241 may also be added for specific cases and extends from bracket 247 near the junction of distribution header 8 and riser 24 to connection with a section of wall panel channel 60 just above fill support beam 58. Suspension supports 223, 241 are most frequently comprised of steel rod, but can be comprised of a prestressed cable.

Figure 25:
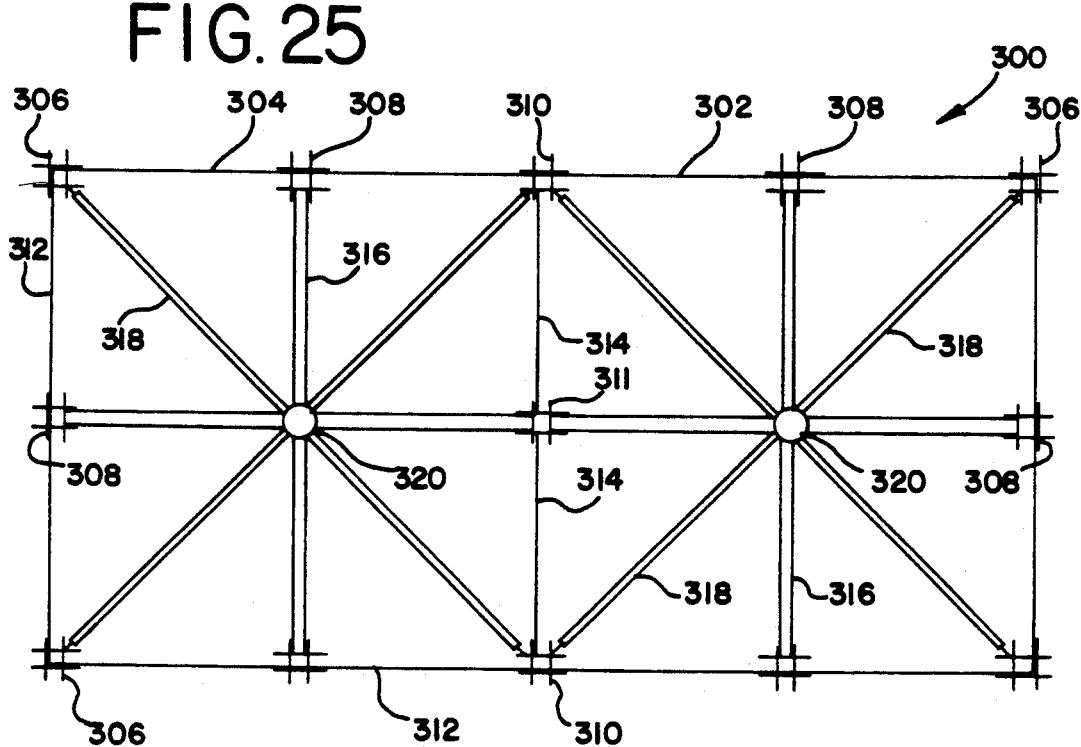
FIG. 25 is a top view in cross section of another embodiment of a large size multiple cell building or cooling tower.

Referring to FIG. 25, cooling tower structure 300 is shown as comprising side by side arranged cells 302 and 304. Each of cells 302 and 304 is essentially identical, including corner columns 306 and middle columns 308 between adjacent corner columns. Central risers 320 extend vertically in each of cells 302 and 304. Support beams 316 extend transversely between central risers 320 and middle columns 308. Further, common corner columns 310 are shared by cells 302 and 304, as is common middle column 311. Outer wall panel assemblies 312 extend between common corner columns 310 and middle column 308, and between corner columns 306 and middle columns 308. Common wall panel assemblies 314 extend between common corner columns 310 and common middle columns 311.

It should be understood for the embodiments of FIG. 22 and 25, the columns, wall panel assemblies, beams, diagonal supports and risers can take on the various forms and materials described above in detail for cooling tower structure 10. In the interest of brevity, these details have not been repeated for these additional embodiments.

It should also be understood that various other structures and cooling towers can be assembled utilizing the basic design structures of the invention. Depending on desired span lengths, additional middle columns could be added to the embodiment of FIG. 25, located in the center of wall panel assemblies 312, diagonals 318 and-/or beams 316. Wall panels 312, diagonals 318 and beams 316 would accordingly become two piece structures and the dimensions of each of cooling tower cells 302 and 304 could extend to forty-eight feet by forty-eight feet or more.

Figure 27:
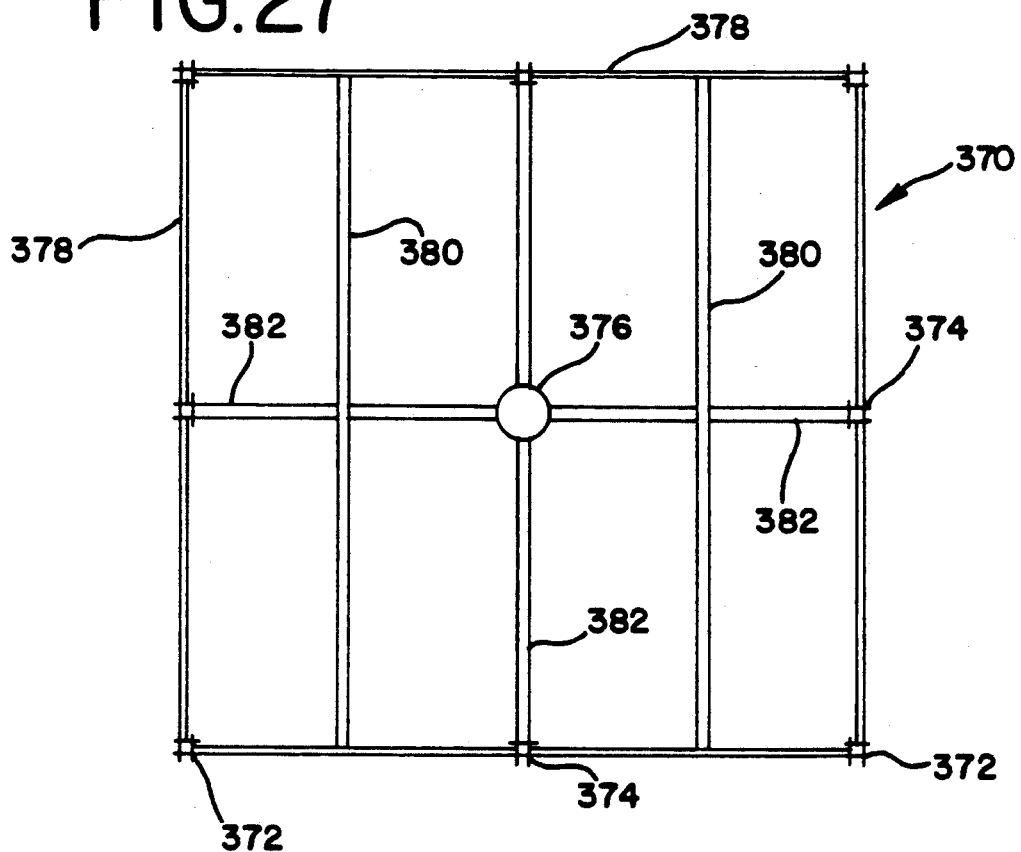
FIG. 27 is a top view in cross section of another in accordance with the present invention.
Figure 28:
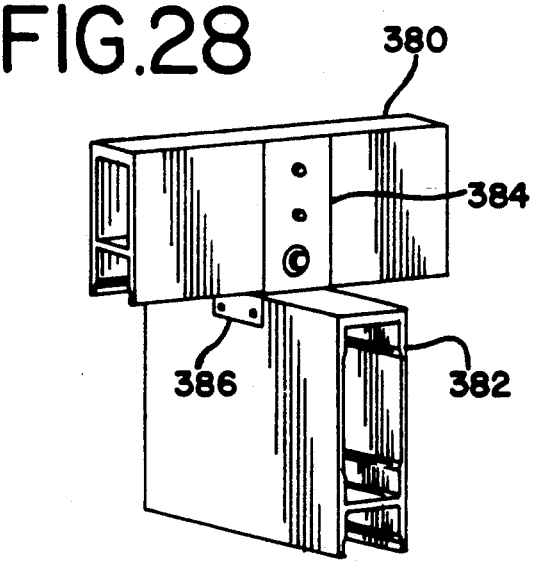
FIG. 28 is a detail partial view of a beam interconnection of the embodiment of FIG. 27.

Referring to FIGS. 27 and 28, a structural assembly in accordance with the present invention is shown generally at 370. A vertical corner column 372 is located at each of the four corners of structure 370. A middle column 374 is located between each pair of corner columns 372. Wall panel assemblies 378 extend between corner columns 372 and middle columns 374. Central structural riser 376 extends vertically from the general center area of structure 370, and a support beam 382 extends transversely from riser 376 to each of middle columns 374. Further, cross beam 380 extends from an inner side of wall panel 378 to cross facing inner side of an opposite wall panel assembly 378, cross beams 380 pass transversely across the top of one of beams 382 utilizing a double saddle bracket 384 having a bottom saddle that is affixed to the top of beam 382.

What is claimed is:

1. A structural assembly comprising:
    at least four vertically extending columns, certain of said columns forming corners of said structural assembly,
    at least eight horizontally extending wall panels, at least two of said wall panels extending between a pair of adjacent columns and each of said wall panels having two end edges, and connecting means joining the ends of each of said wall panels to one of said columns,
    wherein said two wall panels extending between adjacent columns are arranged in a vertically stacked arrangement and further wherein a plurality of separate wall panel connecting means join said stacked wall panels directly to each other such that said stacked wall panels form a structural wall assembly.

2. The structural assembly of claim 1 wherein each of said columns comprises a center portion and corner portions, wherein said center portion comprises a structure having at least four sides, and each of said corner structures comprises a raised sec ton running the length of the junction between two adjacent sides, adjacent raised sections forming a spacing therebetween and each of said two end edges of each of said wall panels inserted into the spacing between said adjacent raised sections.

3. The structural assembly of claim 1 wherein each of said columns comprises a center portion and flange portions, said center portion comprising a generally round column, said flange portions comprising at least two flanges extending outwardly from an outer surface of said center portion,
    and each of said two end edges of each of said two wall panels includes a first opening, and a second aligned opening in each of said flanges, and connecting means passing through said first and second openings to connect one of said two wall panels to said columns.

4. The structural assembly of claim 1 comprising at least twelve horizontally extending wall panels, at least three of said wall panels extending between a pair of adjacent columns,
    of said three walls extending between said pair of adjacent columns, a first wall panel comprising a roof support panel comprising a pair of spaced apart vertical sides, a top section joining said sides and having a pocket section formed by a ledge extending across the top of said roof support panel, and a bottom section comprising two spaced flanges forming a bottom opening,
    a second wall panel comprising a spacer panel comprising a pair of spaced apart vertical sides, a top section joining said sides with a reduced spacing between said sides at said top section, and a bottom section comprising two spaced flanges forming a bottom opening, said top section of said spacer panel inserted into said bottom opening of said roof support panel,
    and a third wall panel comprising a lower wall panel comprising a pair of spaced apart vertical sides, a top section joining said sides with a reduced spacing between said sides at said top section, and a bottom section joining said sides, said top section of said lower panel inserted into said bottom opening of said spacer panel.

5. The structural assembly of claim 1 wherein one of said wall panels is comprised of a pair of spaced apart vertical sides, a top section joining said sides with a reduced spacing between said sides at said top section and a bottom section joining said sides and comprising two spaced flanges forming a bottom opening.

6. The structural assembly of claim 5 further comprising at least one reinforcing rib extending between said sides.

7. The structural assembly of claim 6 wherein in each said wall panel said vertical sides adjacent said reinforcing ribs are of a thickened cross section.

8. The structural assembly of claim 6 wherein said two wall panels in said vertically stacked arrangement are joined by the top section of one wall panel being received into the bottom opening of the other wall panel, and said wall connecting means extend through aligned openings in both the top section of said one wall panel and the bottom section of said other wall panel.

9. The structural assembly of claim 8 wherein said wall panel connecting means comprise steel pins, and pin clips that extend through an opening in one end of said steel pin.

10. The structural assembly of claim 1 wherein one of said wall panels is comprised of a pair of spaced apart vertical sides, a top section comprising two spaced flanges forming a top opening, and a bottom section joining said sides with a reduced spacing between said sides at said bottom section.

11. The structural assembly of claim 10 further comprising at least one reinforcing rib extending between said sides.

12. The structural assembly of claim 10 wherein said two wall panels in said vertically stacked arrangement are joined by the bottom section of one wall panel being received into the top opening of the other wall panel, and said wall connecting means extend through aligned openings in both the bottom section of said one wall panel and the top section of said other wall panel.

13. The structural assembly of claim 1 wherein each of said columns comprises a center portion and flange portions, each of said flange portions formed by a pair of spaced parallel flanges extending outwardly from said center portion,
    and each of said two end edges of each of said two wall panels is inserted between the parallel flanges of a column.

14. The structural assembly of claim 13 wherein the width of each said wall panels is less than the distance between the parallel flanges of a column, and a filler member is inserted between each wall panel and the other parallel flanges of the columns, said filler member comprising a generally hollow structure having a first generally flat wall adjacent said wall panel and an second wall opposite said wall, said second wall having a sloped section to allow the ready insertion and wedging of said spacer between the wall panel and the other parallel flange of the column.

15. The structural assembly of claim 14 further comprising an opening in said other parallel flange of the column and another opening in the second wall of the spacer, such that when said spacer is inserted between the wall panel and the other parallel flange of the column, the openings in the other parallel flange of the column and the second wall of the spacer are aligned, a rivet means extending through the aligned openings in the other parallel flange of the column and the second wall of the spacer to hold said spacer in place.

16. The structural assembly of claim 14 further comprising a sealant between said wall panel and the adjacent flange of said column.

17. The structural assembly of claim 1 wherein one of said wall panels comprises a roof support panel comprising a pair of spaced apart vertical sides, a top section joining said vertical sides and having a pocket section formed by a ledge extending across and above the top of said support roof, and a bottom section comprising two spaced flanges forming a bottom opening.

18. The structural assembly of claim 17 wherein each of said roof support panels is comprised of pultruded fiberglass reinforced resin.

19. The structural assembly of claim 17 further comprising at least one reinforcing rib extending between said sides.

20. The structural assembly of claim 17 wherein said vertical sides between said channel section and said reinforcing rib are of a thickened cross section.

21. The structural assembly of claim 20 wherein each of said roof lintel brackets comprises a structural means and bolt means extending through aligned openings in said roof lintel brackets and said roof support panels to attach said roof lintel brackets to said roof support panels.

22. The structural assembly of claim 17 further comprising a plurality of roof brackets attached to an inside facing surface of certain said roof support panels, and a plurality of roof lintels extending across said structural assembly such that each end of each of said roof lintels is received and attached to one of said roof lintel brackets.

23. The structural assembly of claim 22 wherein each of said roof lintels comprises a structural member comprised of pultruded fiberglass reinforced resin.

24. The structural assembly of claim 17 further comprising roof panels of generally rectangular, generally planar configuration, said roof panels comprised of an outer surface of a fiberglass reinforced resin, and certain of said roof panels having an edge that is received in said pocket section of said roof support panel.

25. The structural assembly of claim 24 wherein each of said roof panels is comprised of a sandwich construction wherein a core of a foam product is covered with said outer surface of said fiberglass reinforced resin.

26. The structural assembly of claim 24 wherein each of said roof panels is comprised of a sandwich construction wherein a core of a wood product is covered with said outer surface of said fiberglass reinforced resin.

27. The structural assembly of claim 1 wherein one of said side wall panels comprises a lower wall panel comprising a pair of spaced apart vertical sides, a top rib joining said sides with a reduced spacing between said sides at said top rib, and a bottom section comprising a bottom rib and two spaced flanges forming a bottom opening.

28. The structural assembly of claim 27 further comprising at least one reinforcing rib extending between said sides.

29. The structural assembly of claim 27 further comprising a plurality of bottom lintel brackets attached to an inside facing surface of certain of said lower wall panels, and a plurality of support lintels extending across said structural assembly such that each end of said support lintels is received and attached to one of said bottom lintel brackets.

30. The structural assembly of claim 29 wherein each of said support lintels comprises a structural beam comprised of pultruded fiberglass reinforced resin.

31. The structural assembly of claim 29 further comprising a fill assembly comprised of a plurality of generally vertically displaced wetted surface media assembled in side by side configuration with said fill assembly placed on top of said support lintels.

32. The structural assembly of claim 29 wherein each of said bottom lintel brackets comprises a structural element, and bolt means extend through aligned openings in said bottom lintel brackets and said lower wall panels to attach said bottom lintel brackets to said lower wall panels.

33. The structural assembly of claim 1 further comprising a structural riser extending vertically at the center of said structural assembly and diagonal braces extending from certain of said vertically extending columns to said riser.

34. The structural assembly of claim 33 wherein said riser comprises a hollow steel round column.

35. The structural assembly of claim 33 wherein each of said diagonal braces comprises a hollow steel round member.

36. The structural assembly of claim 33 further comprising an angle bracket having two legs joined to a corner of one of said columns by bolt means extending through openings in each leg of said angle bracket and openings in adjacent, non-parallel flanges of said column, said angle bracket further comprising an extension member that extends from between said angle bracket legs and said column.

37. The structural assembly of claim 36 wherein each of said diagonal braces comprises a structural steel member having a slot in which said angle bracket extension member is received and affixed.

38. The structural assembly of claim 1 further comprising
wall panel channel means attached to an inside facing surface of certain of said wall panels,
support beam means having one end received by and affixed to said wall panel channel means,
roof beam means having one end received by and affixed to said wall panel channel means,
a structural riser extending vertically at the center of said structural assembly,
said support beam means having another end received by and affixed to said riser, and said roof beam means having another end received by and affixed to said riser.

39. The structural assembly of claim 38 wherein said wall panel channel means are equidistant between said vertically extending columns.

40. The structural assembly of claim 38 wherein each of said wall panel channel means comprises a steel channel member having a flat side adjacent said wall panels and an open face side formed by two flanges facing inwardly from said wall panel.

41. The structural assembly of claim 38 wherein each of said fill support beam means and said roof beam means comprises a pair of spaced apart vertical sides, and a top section joining said sides, said top section including a flat exterior top surface.

42. The structural assembly of claim 38 further comprising a plurality of lintel beam brackets, each of said lintel beam brackets comprising a lower saddle portion having an open face formed by two lower flanges facing downwardly and an upper perpendicular saddle portion having an open face formed by two upper flanges facing upwardly.

43. The structural assembly of claim 38 further comprising a plurality of fill support lintels and a plurality of roof support lintels,
said fill support lintels extending between opposite facing interior sides of said wall panels and across and supported on said fill support beam means,
and said roof support lintels extending between opposite facing interior sides of said wall panels and across and supported on said roof beam means.

44. The structural assembly of claim 38 wherein said fill support beam means and said roof beam means are comprised of pultruded fiberglass reinforced resin.

45. The structural assembly of claim 1 further comprising
a riser extending vertically at the center of said structural assembly,
said riser comprising a structural steel member,
a plurality of distribution headers, each having a first end affixed to sad riser and each extending radially outwardly to one of said wall panels,
each of said distribution headers having a second end affixed to one of said wall panels.

46. The structural assembly of claim 45 further comprising wall panel channel means attached to an inside facing surface of said wall panels,
each of said wall panel channel means being generally equidistant from said vertically extending columns,
and a plurality of distribution header brackets affixed to said wall panel channel means such that said second end of each of said distribution headers is received in one of said distribution header brackets.

47. The structural assembly of claim 45 further comprising a plurality of lateral distribution pipes that have one end affixed to one of said distribution headers, and a plurality of spray nozzles extending downwardly from each of said lateral distribution pipes.

48. The structural assembly of claim 47 further comprising a basin near a lower end of said riser,
said riser comprising a hollow steel round column having a passage for water to be cooled running inside said riser,
each of said distribution headers comprising a hollow member having a passage for water to be cooled operatively connected to said riser passage,
said distribution pipes each comprising a hollow member having a passage for water to be cooled operatively connected to said distribution header passage such that water to be cooled can be sprayed from said spray nozzles.

49. The structural assembly of claim 47 further comprising
a plurality of roof lintel brackets attached to an inside facing surface of certain of said panels,
and a plurality of roof lintels extending across said structural assembly such that each end of each said roof lintel is received and attached to one of said roof lintel brackets,
a plurality of hangers each having a first end affixed to one of said roof lintels and extending downwardly from said roof lintels,
a plurality of distribution support lintels, each of said hangers having a second end connected to one of said distribution support lintels, to support said distribution support lintels,
certain of said lateral distribution pipes placed on top of said distribution support lintels to support said lateral distribution pipes.

50. A structural assembly comprising
at least four columns, certain of each columns located at a corner of said structural assembly,
at least two wall panels extending between two adjacent columns, each of said wall panels having two end edges each received on one of said columns and attached to said columns by connecting means,
said two wall panels comprising an upper wall panel and a lower wall panel directly interconnected by a closed section of one of said wall panels received between flanges along an adjacent edge of the other of said wall panels, and a plurality of separate connecting means passing through aligned openings in said closed section of said one wall panel and said flanges along said edge of said other wall panel to join said upper wall panel directly to said lower wall panel.

51. The structural assembly of claim 50 further comprising
a central riser
and diagonal brace means extending from said riser to each of said corner columns.

52. The structural assembly of claim 51 further comprising
wall panel channel structural means affixed to an inside facing surface of said wall panel,
and support beam means extending from said central riser to said wall panel structural means.

53. The structural assembly of claim 52 further comprising
wall panel structural means affixed to an inside facing surface of said panel,
and, suspension support means extending from said central riser to said wall panel structural means.

54. The structural assembly of claim 50 further comprising a plurality of bottom lintel brackets each affixed to an inside facing surface of certain of said lower wall panels,
a plurality of fill support lintels each extending between two crosswise aligned bottom lintel brackets on oppositely facing lower wall panel surfaces.

55. The structural assembly of claim 54 further comprising a plurality of fill sheets stacked on and supported by said fill support lintels.

56. The structural assembly of claim 50 further comprising a plurality of roof lintel brackets each affixed to an inside facing surface of certain of said upper wall panels, a plurality of roof support lintels each extending between two crosswise aligned roof lintel brackets on oppositely facing inside upper wall panel surfaces.

57. The structural assembly of claim 56 wherein each of said upper wall panels include a deck flange extending along a top of said upper wall panel to form a roofing support space between said top of said upper wall panel and said deck flange, and a plurality of roof panels extending across said roof support lintels, certain of said roof panels having an edge received in said roofing support space.

58. A structural assembly comprising at least four vertically extending columns, certain of said columns located at corners of said structural assembly, at least two wall panels extending between two adjacent corner columns, each of said wall panels having two end edges each received by one of said adjacent corner columns and attached to said corner column by first connecting means, said two wall panels arranged in a vertically stacked configuration and directly interconnected along a joining edge by a plurality of separate second connecting means.

59. The structural assembly of claim 58 wherein said two wall panels comprise an upper wall panel and a lower wall panel interconnected by a closed edge of one of said side panels received between flanges along an adjoining edge of the other of said wall panels, and said second connecting means passing through aligned openings in said closed edge of said one wall panel and said flanges the other of said wall panels.

60. The structural assembly of claim 58 further comprising a central riser, a wall panel structural member along an inside surface of certain of said wall panels, distribution support header means extending from said riser to certain of said wall panel structural members.

61. The structural assembly of claim 58 further comprising, a central riser, a wall panel structural member along an inside surface of certain of said wall panels, suspension support means extending from said riser to certain of said wall panel structural members.

62. The structural assembly of claim 58 further comprising a central riser, diagonal support braces each extending from certain of said columns to said central riser.

63. The structural assembly of claim 58 further comprising a second structural assembly adjacent said structural assembly, said adjacent structural assemblies sharing wall panels and corner columns along a common wall between said adjacent structural assemblies.

64. The structural assembly of claim 59 further comprising a central riser, a roof structure on top of said wall panels, a drive beam extending from said riser to one of said corner columns, a fan assembly mounted to the top of said riser and operatively connected to said drive beam, and a fan shroud surrounding said fan assembly and supported by said roof structure.

65. The structural assembly of claim 58 further comprising a central riser, a roof structure on top of said wall panels, a drive beam extending from said riser to one of said wall panels, a fan assembly mounted to the top of said riser and operatively connected to said drive beam, and a fan shroud surrounding said fan assembly and supported by said roof structure.

66. A structural assembly comprising at least eight vertically extending columns comprising corner columns, certain of said columns located at corners of said structural assembly and certain of said columns comprising middle columns located between said corner columns, at least two wall panels extending between an adjacent corner column and a middle column, each of said wall panels having two end edges each received by said corner column and said middle column and attached to said corner column and said middle column by first connecting means, said two wall panels arranged in a vertically stacked configuration and directly interconnected along a joining edge by a plurality of separate second connecting means.

67. The structural assembly of claim 66 further comprising a central riser, and beam means extending from said central riser to certain of said middle columns.

68. The structural assembly of claim 66 further comprising wall panel structural means affixed to an inside facing surface of certain of said wall panels, and support means each extending between two crosswise aligned wall panel structural means, each of said support means having an end received and connected to one of said wall structural means.

69. The structural assembly of claim 66 further comprising a central riser, and diagonal brace means extending from said riser to each of said corner columns.

70. A structural assembly comprising at least four vertically extending columns, certain of said columns located at corners of said structural assembly, and a plurality of vertically extending middle columns each located generally between two adjacent corner columns, at least two wall panels extending between each corner column and a middle column, each of said wall panels having two end edges, one end edge received by one of said corner columns and the other end edge received by one of said middle columns, and each of said wall panel end edges attached to either of said corner columns of said middle column by first connecting means, said two wall panels arranging a vertically stacked configuration and directly interconnected along a joining edge by a plurality of separate second connecting means.

71. The structural assembly of claim 70 further comprising a structure riser located generally at the center of said structural assembly, and a plurality of beams means each extending from said structural riser to one of said middle columns.

72. The structural assembly of claim 71 further comprising cross beam means extending from one of said wall panel assemblies to a cross adjacent wall panel assembly.

73. The structural assembly of claim 72 wherein said cross beam means extends across one of said beam means.

74. The structural assembly of claim 73 further comprising a beam bracket having a first section affixed to said cross beam means and a second section affixed to said beam means.

* * * * *